(12) United States Patent
Howard et al.

(10) Patent No.: US 8,761,443 B2
(45) Date of Patent: Jun. 24, 2014

(54) AUTOMATIC RECORD DETECTION DEVICE AND METHOD FOR STOP ARM VIOLATION EVENT

(75) Inventors: Richie Howard, West Newton, AL (US); Anthony Hsieh, Hsinchu (TW); George Tang, Miaoli (TW)

(73) Assignees: IVS, Inc., West Newton, AL (US); Digiwell Technology Inc., Hsinchu (TW); George Tang Industrial Corp., Miaoli (TW)

( * ) Notice: Subject to any disclaimer, the term of this patent is extended or adjusted under 35 U.S.C. 154(b) by 246 days.

(21) Appl. No.: 13/449,503

(22) Filed: Apr. 18, 2012

(65) Prior Publication Data

US 2013/0279742 A1    Oct. 24, 2013

(51) Int. Cl.
*G06K 9/00* (2006.01)
*H04N 7/18* (2006.01)
*B60Q 1/26* (2006.01)

(52) U.S. Cl.
USPC ............ 382/103; 348/148; 348/149; 340/433

(58) Field of Classification Search
CPC .................................. G06K 9/00; G08G 1/00
USPC .......... 382/103, 104, 107, 236; 348/148, 149, 348/169, 170, 171, 352; 340/433, 463, 465, 340/525; 712/205, 235
See application file for complete search history.

(56) References Cited

U.S. PATENT DOCUMENTS 7,633,382 B2 * 12/2009 Bowler .......................... 340/433
8,599,260 B1 * 12/2013 Vaughn .......................... 348/149

* cited by examiner

*Primary Examiner* — Abolfazl Tabatabai
(74) *Attorney, Agent, or Firm* — Rosenberg, Klein & Lee

(57) ABSTRACT

An automatic record detection device and method for stop arm violation event, comprising: a plurality of image fetching units, to fetch external video signals; at least an analog-to-digital converter, to process said external video signal into digital data; a processor unit, to detect dynamic images of said digital data based on a set sensitivity value, when said set sensitivity value of said dynamic image of a violating vehicle fulfills an image block number, it determines said dynamic image to trigger a violation event, then generates said digital data based on said external video signal. As such, a user can search said dynamic images of said digital data by examining said triggered violation event, to find out license plate number of a violating vehicle, and sends it to an agency concerned for prosecution, thus saving enormous time and manpower in viewing and searching through said digital data.

23 Claims, 8 Drawing Sheets

AUTOMATIC RECORD DETECTION DEVICE AND METHOD FOR STOP ARM VIOLATION EVENT

BACKGROUND OF THE INVENTION

1. Field of the Invention

The present invention relates to a record detection device and method, and in particular to an automatic record detection device and method for stop arm violation event.

2. The Prior Arts

Presently, in the United States, according to the Federal Law, all the school buses are each provided with a Stop Arm as a traffic sign to stop the vehicles, so that when the school children get on or get off the bus, the vehicles passing nearby in both directions must stop. At this time, in case some vehicles ignore the Stop Arm and continue to drive through in violation of the Law, then the violating vehicle and its license plate number are taken with a video recorder, and then sent to the agency concerned to prosecute the case.

Nowadays, despite the progress of science and technology, the video recorder presently utilized is a digital video recorder, and the digital data stored thereon must be checked manually by viewing to find out the Stop Arm violation event, and the violating vehicles. However, in the search process it requires huge amount of manpower, hereby making it tedious and time-consuming.

Therefore, presently, the design and performance of the record detection device and method for recording Stop Arm violation events are not quite satisfactory, and it has much room for improvements.

SUMMARY OF THE INVENTION

In view of the problems and drawbacks of the prior art, the present invention provides an automatic record detection device and method for stop arm violation event, so as to overcome the shortcomings of the prior art.

A major objective of the present invention is to provide an automatic record detection device and method for stop arm violation event, that detects the dynamic image of digital data based on a set sensitivity value. When the dynamic image of a violation vehicle fulfills the number of image blocks required, then the processor unit determines that the dynamic image belongs to and triggers a violation event. Therefore, the user may utilize the findings of the processor unit to search the dynamic images of digital data, to fine out the license plate number of the violating vehicle, and send it to the agency concerned for prosecution, hereby saving quite a lot of time and manpower in viewing and checking the video data.

Another objective of the present invention is to provide an automatic record detection device and method for stop arm violation event. For this device, part of the functions of a Digital Video Recorder (DVR) presently available on the market can be utilized as an extension of the present invention, to save large amount of time and effort in producing and applying the present invention, thus enabling the present invention to have multiple functions In order to achieve the objective mentioned above, the present invention provides an automatic record detection device and method for stop arm violation event, comprising: a plurality of image fetching units, at least an analog-to-digital converter, at least a processor unit, at least a storage unit, and at least an input unit. Wherein each of the plurality of image fetching units is used to fetch external video signals. The analog-to-digital converter is connected electrically to the image fetching unit, to process the external video signal into the digital data. The processor unit is connected electrically to the analog-to-digital converter to receive the digital data, and it detects the dynamic image of the digital data based on a set sensitivity value. When the set sensitivity value fulfills a set condition, it determines, triggers, and records a violation event. The storage unit is connected electrically to the processor unit, so that the processor unit can read or write digital data of the violation event from/to the storage unit. The input unit is connected electrically to the processor unit, to send activation signal to the processor unit, so that upon receiving the activation signal, the processor unit may detect the dynamic image in the digital data, and write the violation event in the storage unit.

The present invention also provides an automatic record detection method for stop arm violation event, comprising at least the following steps: send out an activation signal, set the external video signal of a detection area, generate digital data based on the external video signal; detect the dynamic image of the digital data based on the set sensitivity value, and determine if the set sensitivity value of the dynamic image fulfills a set condition. In case the answer if negative, return to the step of generating digital data based on the external video signal. Otherwise, it determines that the dynamic images belong to the violation event, and it continues to generate digital data based on the external video signal.

Further scope of the applicability of the present invention will become apparent from the detailed descriptions given hereinafter. However, it should be understood that the detailed descriptions and specific examples, while indicating preferred embodiments of the present invention, are given by way of illustration only, since various changes and modifications within the spirit and scope of the present invention will become apparent to those skilled in the art from this detailed descriptions.

BRIEF DESCRIPTION OF THE DRAWINGS

The related drawings in connection with the detailed descriptions of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed descriptions with reference to the attached drawings.

Figure 1:
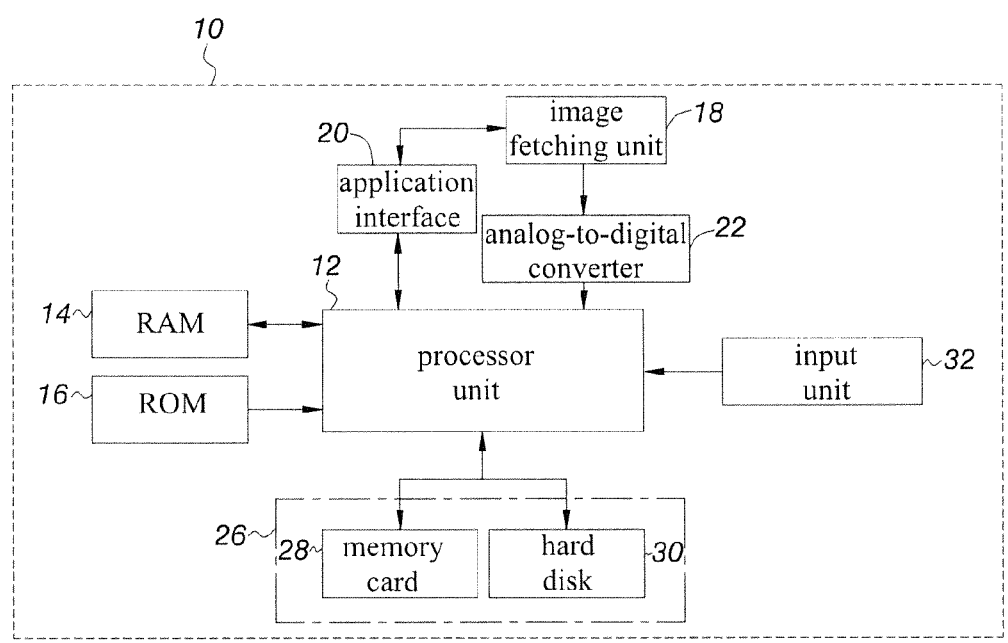
FIG. 1 is a block diagram of an automatic record detection device for stop arm violation event according to a first embodiment of the present invention.
Figure 2:
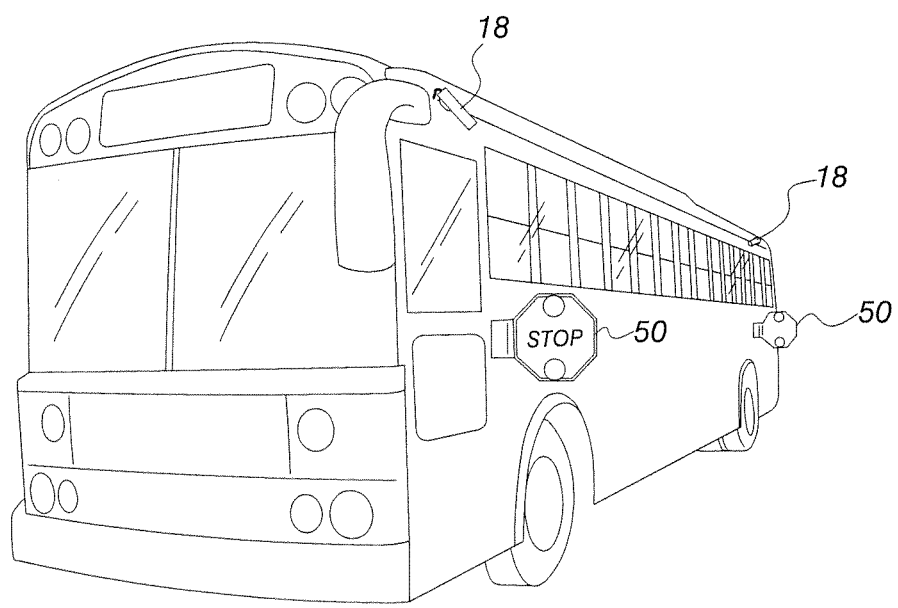
FIG. 2 is a schematic diagram showing image fetching units and stop arms installed on a vehicle according to a first embodiment of the present invention.
Figure 3:
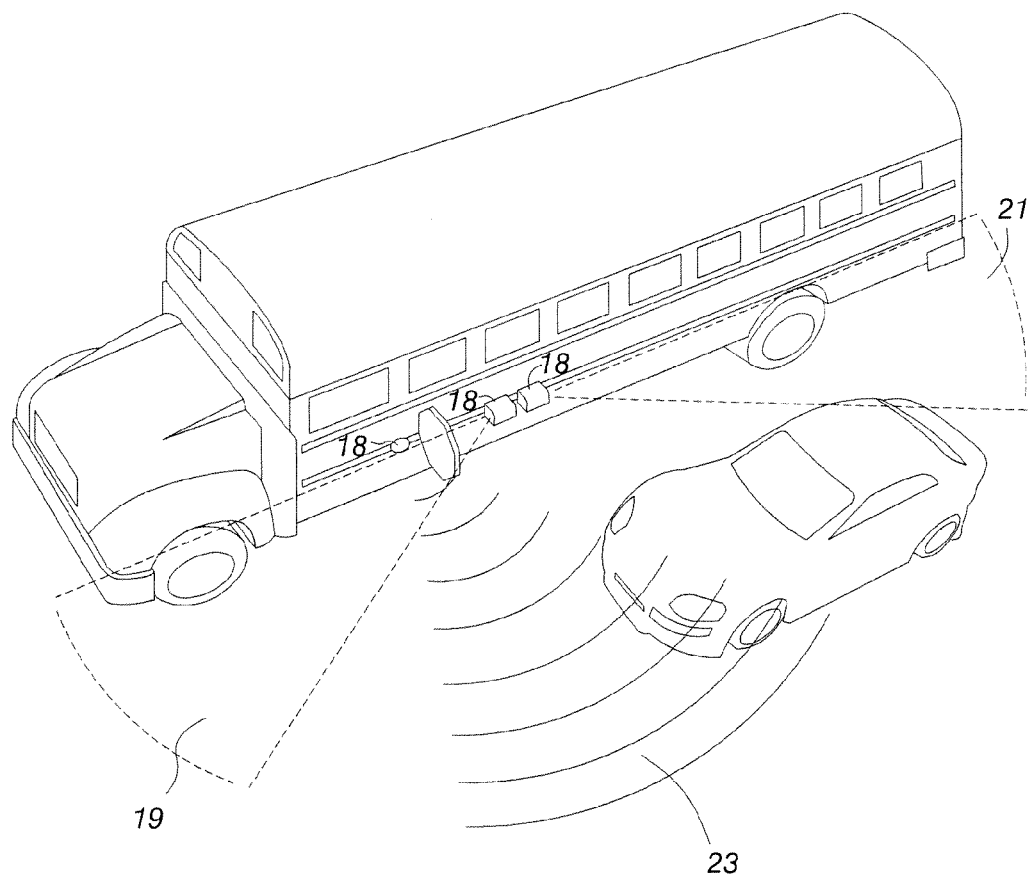
FIG. 3 is a schematic diagram showing a plurality of image fetching units installed around a vehicle with another vehicle passing by according to a first embodiment of the present invention.

Refer to FIGS. 1, 2, and 3 respectively for a block diagram of an automatic record detection device for stop arm violation event according to a first embodiment of the present invention; a schematic diagram showing image fetching units and stop arms installed on a vehicle according to the first embodiment of the present invention; and a schematic diagram showing a plurality of image fetching units installed around a vehicle with another vehicle passing by according to the present invention. As shown in FIGS. 1, 2, and 3, the automatic record detection device for stop arm violation event 10 includes: a plurality of image fetching units 18, at least an analog-to-digital converter 22, at least a processor unit 12, at least a storage unit 26, and at least an input unit 32. Wherein, the at least a processor unit 12, such as a digital data processor or a central processor unit (CPU) or a combination of both, is connected electrically to a Random Access Memory (RAM) 14 and a Read Only Memory (ROM) 16, which is used to read or write data and programs for executing by the processor unit. The plurality of image fetching units 18 are used to fetch external video signals, and are connected to the automatic record detection device for stop arm violation event 10 via a built-in application interface 20. The application interface 20 is a software for the interaction and communications between user, the processor unit 12, and the image fetching unit 18. The main objective of the application interface 20 is to facilitate the user to control effectively the two-way interactions between the processor unit 12 and the image fetching unit 18. Therefore, the present invention is capable of controlling the processor unit 12 via the application interface 20, to set any of the image fetching units 18 into an open or closed state.

The processor unit 12 is connected electrically to the analog-to-digital converter 22, to receive digital data, such as external video signal and external audio signal. The processor unit 12 is used to detect the dynamic image of digital data based on the set sensitivity value, when the sensitivity value of the dynamic image fulfills a set condition, the processor unit 12 determines that the dynamic images belong to a violation event, and it triggers and records the violation event. The set condition corresponds to an image block number 24 of the digital data, with its range from 1 to the entire image. The processor unit 12 is connected electrically to at least a storage unit 26, such as a memory card 28 or a hard disk 30. The processor unit 12 can read or write digital data or violation event from/to the storage unit 26. At least an input unit 32 is connected electrically to the processor unit 12, to send out an activation signal to the processor unit 12. Upon receiving the activation signal, the processor unit 12 is able to proceed with detecting dynamic image of the digital data, and write the violation event into the storage unit 26.

Then, refer to FIG. 3 for a schematic diagram showing a plurality of image fetching units installed around a vehicle with another vehicle passing by according to the first embodiment of the present invention. As shown in FIG. 3, in the present invention, at least three image fetching units 18 can be installed on one side of a school bus, to detect the first region 19, the second region 21, and the third region 23. respectively. Since the detection directions of two image fetching units 18 are in parallel with the school bus driving direction, such that when a violating vehicle appears in the first region 19 and the second region 21, the front and rear license plate numbers can be shown clearly in the two regions. The detection direction of the third image fetching unit 18 is perpendicular to the driving direction of the school bus, so that the addition of the third region 23 can display the violating vehicle in all directions. In this way of installation, a user may get a complete view of the vehicle including the license plate. In the present invention, three image fetching units 18 are utilized to explain the execution of the present invention, but the present invention is not limited to this, such that the number of image fetching unit 18 can be increased or decreased depending on actual requirement.

Figure 4:
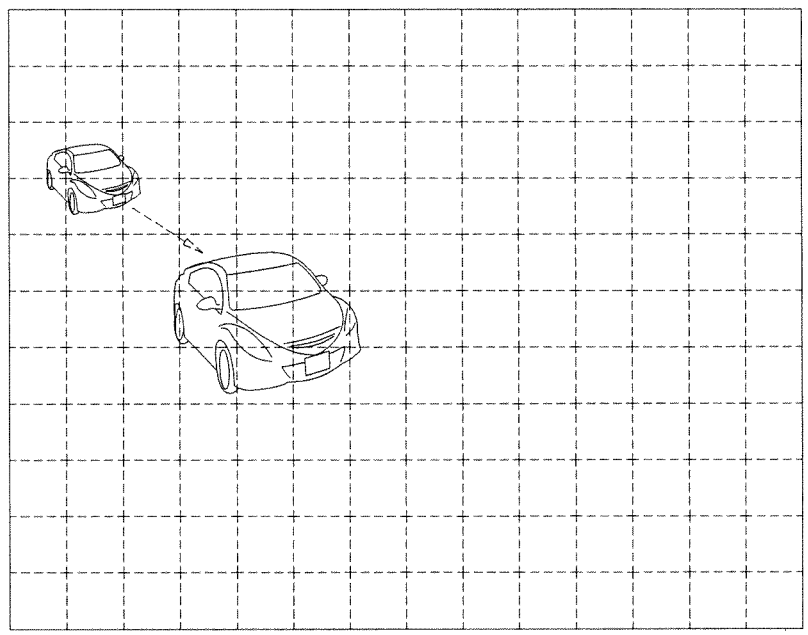
FIG. 4 is a schematic diagram showing detection of dynamic image of a vehicle according to a first embodiment of the present invention.
Figure 5:
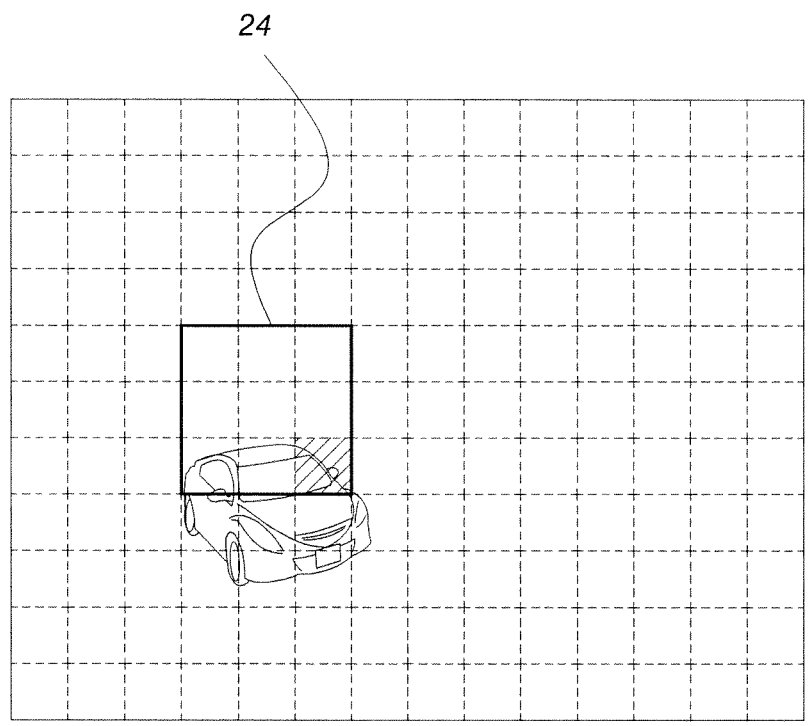
FIG. 5 is a schematic diagram showing detection of dynamic image of a vehicle according to a first embodiment of the present invention when the image block number is 1.
Figure 6:
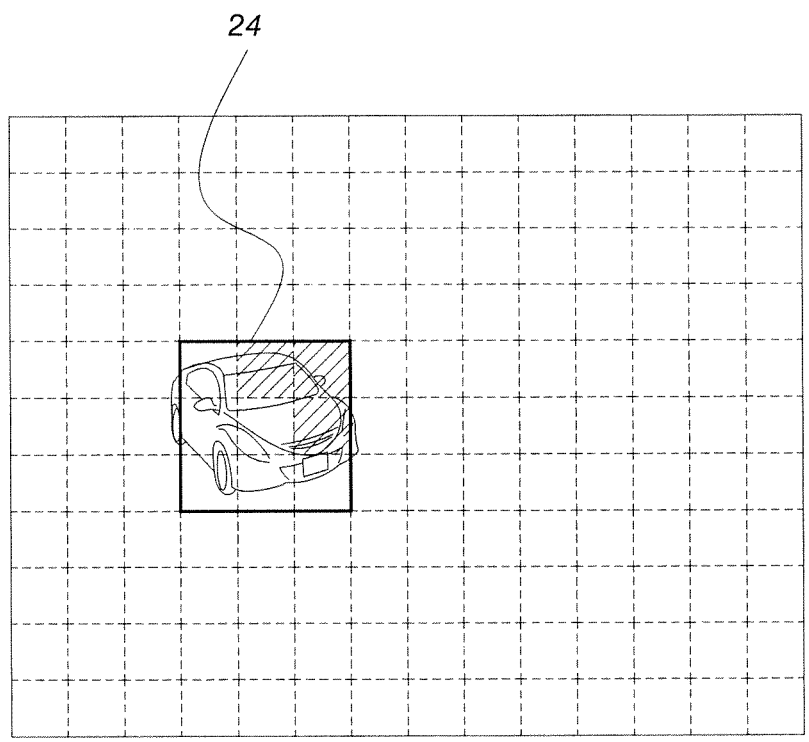
FIG. 6 is a schematic diagram showing detection of dynamic image of a vehicle according to a first embodiment of the present invention when the image block number is 3.

Subsequently, refer to FIGS. 4, 5, 6 respectively for a schematic diagram showing detection of dynamic image of a vehicle according to the first embodiment of the present invention; a schematic diagram showing detection of dynamic image of a vehicle according to the first embodiment of the present invention when the image block number is 1; and a schematic diagram showing detection of dynamic image of a vehicle according to the first embodiment of the present invention when the image block number is 3. Also, refer to FIG. 1 at the same time. As shown in FIGS. 1 and 4, when a school bus is installed and equipped with the an automatic record detection device for stop arm violation event 10, a user may use the application interface 20 to control the processor unit 12, and set the image fetching units 18 into an open or closed state, to make sure at least one detection region can provide external video signals. When a violating vehicle appears in the detection region, the processor unit 12 detects its dynamic images of digital data based on a set sensitivity value. Then, as shown in FIGS. 1 and 5, when the image block number 24 is set to 1 (the block with slant line as shown in FIG. 5), and the image of the violating vehicle fulfills the image block number 24, then the processor unit 12 determines that the dynamic image belongs to a violation event, thus triggering and recording such an event. Then, as shown in FIGS. 1 and 6, when the image block number 24 is set to 3 (the block with slant line as shown in FIG. 6), and the image of the violating vehicle fulfills the image block number 24, then the processor unit 12 determines that the dynamic image belongs to a violation event, thus triggering and recording such an event.

In this way, a user may utilize the violation event triggered by the processor unit 12 to check and search the dynamic images in the digital data to find out the license plate number of the violating vehicle, and send it to the agency concerned for prosecution. As such, large amount of time requiring for viewing the enormous dynamic images can be saved. Though, in the first embodiment as shown in FIGS. 5 and 6, the image block numbers of 1 and 3 are taken as example for explanation, but the present invention is not limited to this. As mentioned earlier, the range of image block number can be set to from 1 to number of the entire image.

Figure 7:
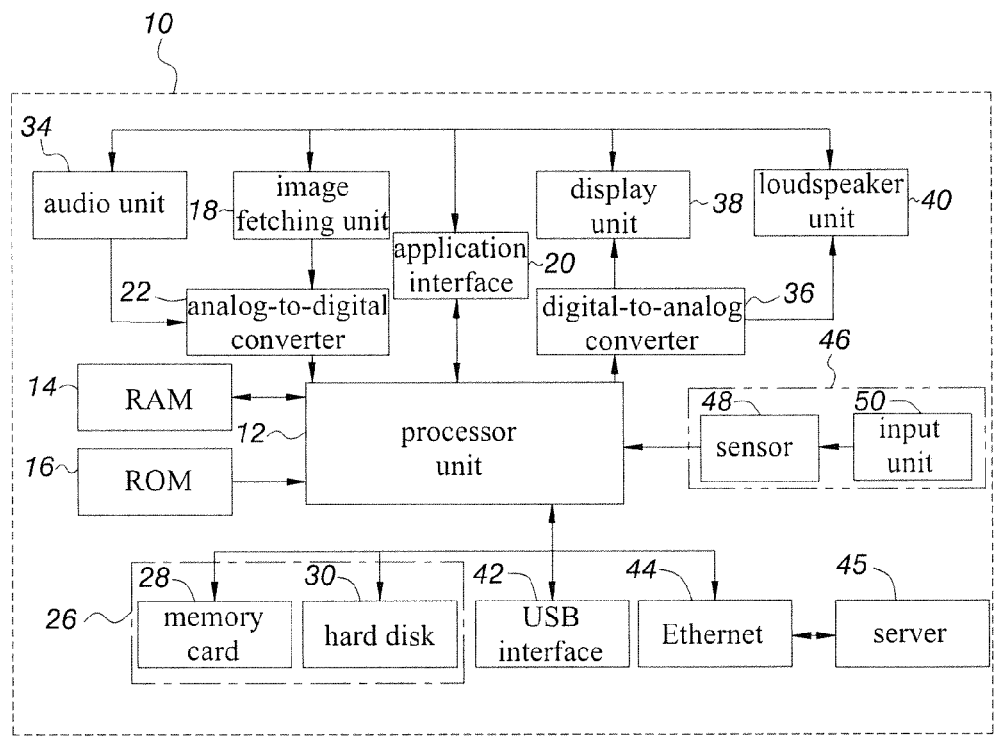
FIG. 7 is a block diagram of an automatic record detection device for stop arm violation event according to a second embodiment of the present invention.

Then, refer to FIG. 7 for a block diagram of an automatic record detection device and for stop arm violation event according to a second embodiment of the present invention. Also, refer to FIGS. 1 and 2 at the same time. As shown in FIGS. 1 and 2, in the present invention, part of the functions of a Digital Video Recorder (DVR) presently available on the market can be utilized as an extension of the present invention, so as to save enormous time and efforts in producing and applying the present invention, thus enabling the present invention to have multiple functions, as explained as follows. In the second embodiment, the electrical connections for components between the processor unit 12 and the input unit 32 are the same as that of the first embodiment, and it will not be repeated here for brevity. The only difference is that, in the second embodiment, at least an audio unit 34 is provided to fetch the external audio signals. Similarly, an application interface 20 can be used to control the processor unit 12 to set any of the audio units 14 to an open or closed state. The analog-to-digital converter 22 is connected electrically to the audio signal 34, to process the external audio signal into digital signal.

The at least a digital-to-analog converter 36 is connected electrically a processor unit 12, such that the digital-to-analog converter 36 process the digital data into imaging signals and audio signals. The display unit 38 is connected electrically to the digital-to-analog converter 36, to receive and display the image signals. Loudspeaker unit 40 is connected electrically to the digital-to-analog converter 36, to receive and display the audio signals. The application interface 20 is used to control double direction interaction and control of the processor unit 12, display unit 38, and the loud speaker unit 40, so that the user is able to proceed directly with examining the violation event on the school bus, to search for the dynamic images of digital data. Or the user is able to use the application interface 20 to control processor unit 12, to transmit digital data and violation event to an electronic calculator at the other end through a Universal Serial Bus (USB) interface 42, so that when the school bus returns to the bus station, the user is able to review and browse digital data and violation event on another electronic calculator. Or the user is able to use the application interface 20 to control the processor unit 12 to control the interface 44 via network the connection to an Ethernet or wireless network, and to transmit digital data and violation event to a Server 45. Wherein, on receiving the digital data and violation event, the server 45 may at the same time transmit digital data and violation event on its own initiative to the remote end to inform another user, and for the agency in charge to review and browse digital data and violation event, in taking a step further to prosecute the violating vehicle.

The input unit 32 shown in FIGS. 1, 2, and 7 can be an alarm unit 46, which is provided with a sensor 48, and a stop arm 50. The stop arm 50 can be in an open state or a closed state. The sensor 48 is connected electrically to the stop arm 50, and is able to sense the open or closed state of the stop arm 50. When the school bus starts to move, the stop arm 50 is in a closed state, and the processor unit 12 is connected electrically to the analog-to-digital converter 22, to receive the digital data of external video signal and external audio signal. When the school bus stops moving and the school children start to get on and get off the school bus, the stop arm 50 is set in an open state. Subsequently, when the sensor 48 senses the stop arm 50 is in an open state, it starts to detect the dynamic image of the digital data, and write in the violation event. Wherein, the action of the stop arm 50 can be controlled directly through a switch, or similarly, the user may use the application interface 20 to control the processor unit 12 to connect to the stop arm 50 to perform the actions required.

Figure 8:
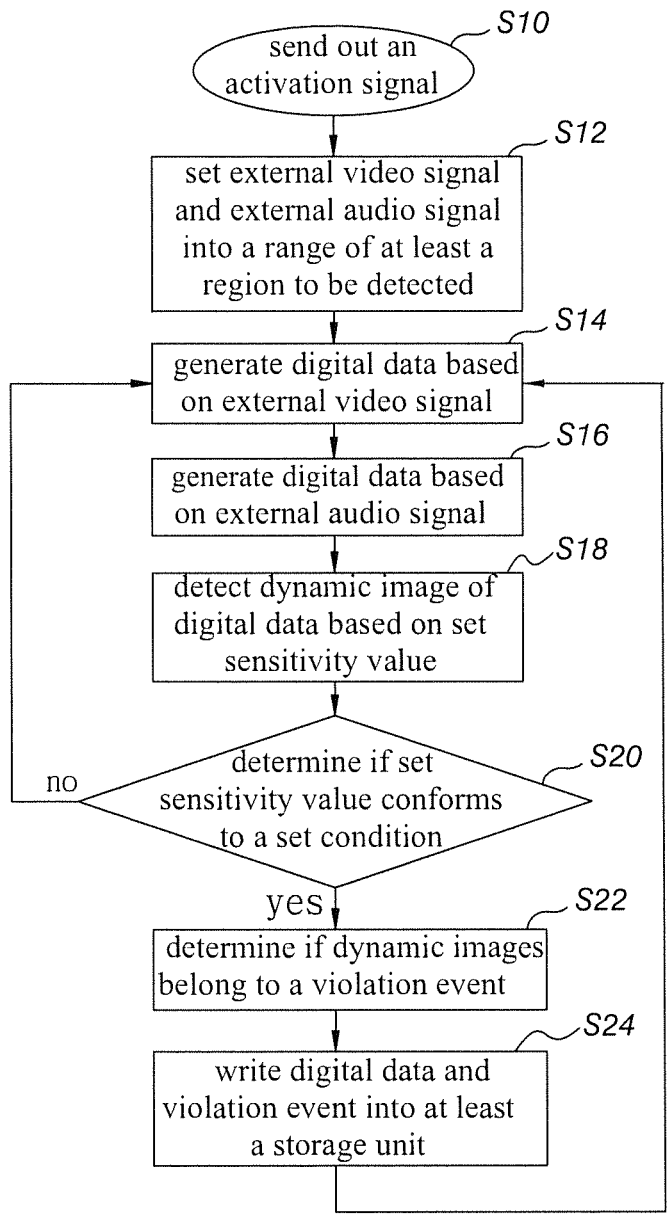
FIG. 8 is a flowchart of the steps of an automatic record detection method for stop arm violation event according to an embodiment of the present invention.

Then, refer to FIG. 8 for a flowchart of the steps of an automatic record detection method for stop arm violation event according to the present invention. Also, refer to FIG. 1, 3, 7 at the same time. As shown in FIGS. 1, 3, and 7, the present invention discloses an automatic record detection method for stop arm violation event, comprising at least the following steps. Firstly, as shown in step S10, a user utilizes an application interface 20 to send out an activation signal. Next, as shown in step S12, upon receiving the activation signal, the processor unit 12 sets an external video signal and an external audio signal in at least a region to be detected, based on the open or closed state of the image fetching unit 18 as set through the application interface 20. Then, as shown in step S14, the analog-to-digital converter 22 generates the digital data based on the external video signal as fetched by the image fetching unit 18. Subsequently, as shown in step S16, the analog-to-digital converter 22 generates the digital data based on the external audio signal as fetched by the audio unit 34. Then, as shown in step S18, the processor unit 12 detects the dynamic image of the digital data based on the set sensitivity value. Then, as shown in step S20, the processor unit 12 determines if the set sensitivity value fulfills a set condition, wherein, the set condition is the image block number of the digital data having its range from 1 to the entire image. In case the answer is negative, then the process returns to step S14, otherwise, it proceeds to step S22, to determine that the dynamic images belong to a violation event. Finally, as shown in step S24, the processor unit 12 writes the digital data and the violation event into at least a storage unit 26, and then the process returns to step S14. In the step mentioned above, the storage unit 26 can be a memory card 28 or a hard disk 30. When the automatic record detection method for stop arm violation event is used in the installation and application approaches of the plurality of image fetching units as shown in FIG. 3, the at least a region set in step S12 is the third region 23 shown in FIG. 3. When the set sensitivity value of the third region 23 fulfills the set condition, it will be written to the image address of the first region 19 and the second region 21.

Finally, when a user decides to terminate the automatic record detection method for stop arm violation event according to the present invention, he may use the application interface 20 to control the processor unit 12, to send out a termination signal, to end this automatic record detection method for stop arm violation event, in any of the step S10 to S24.

Through the application of the automatic record detection device and method for stop arm violation event, and by using the technical means of the first embodiment and the second embodiment as mentioned above, a user is able to detect the dynamic image of digital data based on the set sensitivity value, to trigger and record a violation event. Then, the user can examine the violation event, and search the dynamic images in the digital data, to find out the license plate number of the violating vehicle, and send it to the agency concerned for prosecution, thus saving enormous amount of time in viewing and searching through the digital video data.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. An automatic record detection device for stop arm violation event, comprising:

a plurality of image fetching units, each of them is used to fetch external video signals;

at least an analog-to-digital converter, connected electrically to said image fetching unit, to process said external video signal into digital data;

at least a processor unit, connected electrically to said analog-to-digital converter to receive said digital data, and it detects said dynamic images of said digital data based on a set sensitivity value, when said set sensitivity value fulfills a set condition, it determines, triggers, and records a violation event;

at least a storage unit, connected electrically to said processor unit, so that said processor unit reads or writes said digital data or said violation event from/to said storage unit; and at least an input unit, connected electrically to said processor unit, to send an activation signal to said processor unit, so that upon receiving said activation signal, said processor unit detects said dynamic image, to determine said violation event.

2. The automatic record detection device for stop arm violation event as claimed in claim 1, further comprising: at least an audio unit, used to fetch an external audio signal, said audio unit is connected electrically to said analog-to-digital converter, and said analog-to-digital converter processes said external audio signal into said digital data.

3. The automatic record detection device for stop arm violation event as claimed in claim 2, further comprising: at least a digital-to-analog converter, connected electrically to said processor unit, said digital-to-analog converter receives and processes said digital data into an image signal.

4. The automatic record detection device for stop arm violation event as claimed in claim 3, further comprising: a display unit and a loudspeaker unit, said display unit is connected electrically to said digital-to-analog converter, to receive and display said image signal, said loudspeaker unit is connected electrically to said digital-to-analog converter, to receive and display said audio signal.

5. The automatic record detection device for stop arm violation event as claimed in claim 1, wherein when a plurality of image fetching units are provided, any one of said image fetching units is set into an open or closed state.

6. The automatic record detection device for stop arm violation event as claimed in claim 1, wherein said set condition is an image block number of said digital data, with its range from 1 to entire image.

7. The automatic record detection device for stop arm violation event as claimed in claim 1, further comprising:
  a random access memory (RAM), connected electrically to said processor unit, for reading or writing data; and
  a read only memory (ROM), connected electrically to said processor unit, used for reading said digital data.

8. The automatic record detection device for stop arm violation event as claimed in claim 1, further comprising: a network control interface, connected electrically to said processor unit, said processor unit is connected to an Ethernet or a wireless network through said network control interface, to transmit said digital data and said violation event to a server.

9. The automatic record detection device for stop arm violation event as claimed in claim 8, wherein said server receives said digital data and said violation event, to transmit said digital data and said violation event to a remote end user on its own initiative.

10. The automatic record detection device for stop arm violation event as claimed in claim 1, further comprising: a universal serial bus (USB) interface, connected electrically to said processor unit, such that said processor unit transmits said digital data and said violation event to a peripheral device through said USB interface.

11. The automatic record detection device for stop arm violation event as claimed in claim 1, wherein said storage unit is a memory card or a hard disk.

12. The automatic record detection device for stop arm violation event as claimed in claim 1, wherein said input unit is an alarm unit, provided with a sensor or a stop arm, said stop arm having an open state and a closed state, said sensor is connected electrically to said stop arm, to sense state of said stop arm.

13. The automatic record detection device for stop arm violation event as claimed in claim 1, wherein said processor unit is a digital data processor or a central processor unit (CPU) or a combination of both.

14. An automatic record detection method for stop arm violation event, comprising following steps:
  (A) transmit an activation signal;
  (B) set an external video signal in at least a region to be detected;
  (C) generate digital data based on said external video signal;
  (D) perform detecting dynamic images of said digital data based on a set sensitivity value; and
  (E) determine if said set sensitivity value fulfills a set condition, if answer is negative, return to step (C), otherwise, determine if said dynamic image belongs to a violation event, and continue to execute step (C).

15. The automatic record detection method for stop arm violation event as claimed in claim 14, wherein after said step (C), it further includes a step of : setting an external video signal in a region to be detected, to generate said digital data based on said external video signal.

16. The automatic record detection method for stop arm violation event as claimed in claim 15, wherein said digital data includes an image signal and an audio signal.

17. The automatic record detection method for stop arm violation event as claimed in claim 15, wherein after said step (E), it further includes a step of: writing said digital data and said violation event into at least a storage unit.

18. The automatic record detection method for stop arm violation event as claimed in claim 15, wherein after said step (E), it further includes a step of: transmitting a termination signal to end said automatic record detection method for stop arm violation event.

19. The automatic record detection method for stop arm violation event as claimed in claim 18, wherein said storage unit is a memory card or a hard disk.

20. The automatic record detection method for stop arm violation event as claimed in claim 14, wherein said set condition is an image block number of said digital data, with its range from 1 to entire image.

21. The automatic record detection method for stop arm violation event as claimed in claim 14, wherein said digital data and said violation event are transmitted to a server via an Ethernet or a wireless network.

22. The automatic record detection method for stop arm violation event as claimed in claim 21, wherein said server receives said digital data and said violation event, and transmits said digital data and said violation event to a remote end user on its own initiative.

23. The automatic record detection method for stop arm violation event as claimed in claim 14, wherein said digital data and said violation event are transmitted to a peripheral device through a universal serial bus (USB) interface.

* * * * *